United States Patent
Tanabe

(10) Patent No.: US 7,876,393 B2
(45) Date of Patent: Jan. 25, 2011

(54) SURFACE-AREA LIGHT SOURCE AND LCD DEVICE HAVING LIGHT GUIDE PLATE WITH A SIDE SURFACE HAVING A STAIRCASE SHAPE IN WHICH A PLURALITY OF LIGHT EMITTING DEVICES ARE FIXED TO RESPECTIVE STEPS THEREOF

(75) Inventor: Takayoshi Tanabe, Kizugawa (JP)

(73) Assignee: Sharp Kabushiki Kaisha, Osaka (JP)

( * ) Notice: Subject to any disclaimer, the term of this patent is extended or adjusted under 35 U.S.C. 154(b) by 185 days.

(21) Appl. No.: 12/297,244

(22) PCT Filed: Feb. 1, 2007

(86) PCT No.: PCT/JP2007/051686

§ 371 (c)(1),
(2), (4) Date: Oct. 15, 2008

(87) PCT Pub. No.: WO2007/138763

PCT Pub. Date: Dec. 6, 2007

(65) Prior Publication Data

US 2009/0279020 A1 Nov. 12, 2009

(30) Foreign Application Priority Data

Jun. 1, 2006 (JP) ............................ 2006-152988

(51) Int. Cl.
*G02F 1/1335* (2006.01)

(52) U.S. Cl. ............................ 349/62; 349/65; 362/612; 362/613; 362/97.3

(58) Field of Classification Search ............ 349/61–65; 362/612, 613, 621, 97.1–97.3

See application file for complete search history.

(56) References Cited

U.S. PATENT DOCUMENTS

| 6,930,737 B2 * | 8/2005 | Weindorf et al. .............. 349/96 |
| 7,331,694 B2 * | 2/2008 | Lee et al. ..................... 362/335 |
| 2004/0109306 A1 | 6/2004 | Lee |
| 2004/0114345 A1 | 6/2004 | Kim et al. |

FOREIGN PATENT DOCUMENTS

| JP | 11-133394 A | 5/1999 |
| JP | 11-260134 A | 9/1999 |
| JP | 2002-150824 A | 5/2002 |
| JP | 2003-086013 A | 3/2003 |
| JP | 2003-109421 A | 4/2003 |
| JP | 2004-342472 A | 12/2004 |
| JP | 2004-349143 A | 12/2004 |

OTHER PUBLICATIONS

Official Communication issued in International Patent Application No. PCT/JP2007/051686, mailed on Feb. 27, 2007.

\* cited by examiner

*Primary Examiner*—John Heyman
(74) *Attorney, Agent, or Firm*—Keating & Bennett, LLP

(57) ABSTRACT

In a surface-area light source device, a light entrance side surface of a light guide plate of a surface-area light source device has a staircase shape having steps in the vertical direction, and light emission diodes are provided at each step. The structure enables the distance between a light emission diode provided at one step and light emission diodes provided at an adjacent step to be maintained greater even if the thickness of the light guide plate is reduced so as to decrease intervals of the light emission diodes in the direction of the thickness of the light guide plate. As a consequence, the amount of transmission and reception of heat produced by the light emission diodes is reduced to prevent an increase in the temperature of the diodes. This allows a reduction in the thickness of the light guide plate with the brightness of light emitted from the light guide plate maintained, enabling the surface-area light source device to be thinned. As a result, a large number of light emitting diodes are provided, so that the brightness of the surface light source device is increased.

15 Claims, 12 Drawing Sheets

SURFACE-AREA LIGHT SOURCE AND LCD DEVICE HAVING LIGHT GUIDE PLATE WITH A SIDE SURFACE HAVING A STAIRCASE SHAPE IN WHICH A PLURALITY OF LIGHT EMITTING DEVICES ARE FIXED TO RESPECTIVE STEPS THEREOF

BACKGROUND OF THE INVENTION

1. Field of the Invention

The present invention relates to a surface-area light source device that is applicable to liquid crystal display devices represented by television monitors, personal computer monitors, and the like. The present invention also relates to a liquid crystal display device having such a surface-area light source device.

2. Description of the Related Art

Today, flat liquid crystal display devices having a backlight mechanism are widely used as monitors for television sets and personal computers.

A liquid crystal display device having the mechanism mentioned above includes a liquid crystal display panel formed of two glass plates and a liquid crystal layer sandwiched between the two glass plates, and a surface-area light source device placed on the rear surface side of the liquid crystal display panel. The liquid crystal display panel transmits or blocks light from the surface-area light source device, and thereby an image is displayed.

The surface-area light source device includes a light guide plate and a light source disposed on a side surface thereof; light emitted from the light source enters the light guide plate from the side surface to be smoothed in the shape of a plane by being repeatedly reflected and refracted inside the light guide plate, and is uniformly outputted from a top surface of the light guide plate. Cold-cathode tubes have conventionally been used as the light source described above, but recently, light emitting diodes, which are brighter and have a longer life than cold-cathode tubes, have come to be used as well.

In the case where a light emitting diode, which is a dot light source, is used in a surface-area light source device of a large liquid crystal display device such as a television monitor and a personal computer monitor, a large number of light emitting diodes need to be provided in order to secure a sufficient amount of light.

However, in the case where a thin light guide plate is used for the purpose of achieving a thinner and lighter surface-area light source device and thereby achieving a thinner and lighter liquid crystal display device, the light guide plate does not have a wide side surface, and thus the space for light emitting diodes is limited. This may make it impossible to provide a sufficient number of light emitting diodes, resulting in an insufficient amount of light of the surface-area light source device. In addition, some arrangements of light emitting diodes may prevent light from being uniformly outputted from the light guide plate, causing unevenness in brightness and color.

To solve these problems, Japanese Patent Laid-open No. 2004-342472 (pages 3 to 5, FIG. 3) proposes a surface-area light source device in which light is uniformly outputted from a light guide plate. This surface-area light source device is provided with dot light sources arranged in two rows near a side surface of a light guide plate and along a long side of the side surface of the light guide plate. The dot light sources of a second row are arranged such that they do not overlap the dot light sources of a first row, and thereby dark spaces between any two light sources are eliminated to allow light to uniformly enter the light guide plate, and as a result, uniform emission of light from the light guide plate is achieved.

However, with the surface-area light source device proposed in Japanese Patent Laid-open No. 2004-342472, since light emitting-diode chips serving as the light source are arranged in two rows on a side surface, if the distance between the two rows is small, adjacent ones of the light emitting diodes give and receive heat they generate to and from each other. As a result, the temperature of the light emitting diodes rises to cause the light emission intensity and the emission wavelength of the light emitting diodes to change, which results in a non-uniform emission of light from the light guide plate. On the other hand, if a smaller amount of current is supplied to the light emitting diodes to reduce the amount of heat they generate, light from the light guide plate deteriorates in brightness.

SUMMARY OF THE INVENTION

In view of the above-described problems, preferred embodiments of the present invention provide a thin surface-area light source device having high brightness in which a large number of light emitting diodes can be disposed on a side surface of a light guide plate without increasing the thickness of the light guide plate, and in which the increase of the temperature of the light emitting diodes can be reduced.

According to a preferred embodiment of the present invention, a surface-area light source device includes: a light guide plate arranged to receive light through a side surface thereof and output the light from a top surface thereof, and a plurality of light emitting devices arranged to emit light that enters the light guide plate through the side surface of the light guide plate. Here, at least one of side surfaces of the light guide plate through which light from the light emitting devices enters the light guide plate has a staircase shape having steps in a direction perpendicular or substantially perpendicular to a long side of a side surface of the light guide plate.

According to another preferred embodiment of the present invention, a liquid crystal display device includes the surface-area light source device having the above described structure.

According to a structure of a preferred embodiment of the present invention, in a surface-area light source device having a light guide plate that receives light through a side surface thereof and outputs the light from a top surface thereof and a plurality of light emitting devices for emitting light that enters the light guide plate through the side surface of the light guide plate, the light emitting devices can be disposed on steps arranged in a staircase shape.

In this surface-area light source device, even if the thickness of the light guide plate and the distance between the light emitting devices in the direction of the thickness of the light guide plate are reduced, the distance between a light emitting device disposed on a step and an adjacent light emitting device that is disposed on an adjacent step remains large. This helps reduce the giving and receiving of heat generated by the light emitting devices, and thereby the temperature rise of the light emitting devices can be reduced. As a result, the light guide plate can be made thinner without reducing the brightness of light that exits the light guide plate, and this contributes to achieving a thinner surface-area light source device.

By forming the light guide plate such that it is thicker near a side surface through which light from the light emitting devices enters the light guide plate than in a portion through which light exits the light guide plate, more steps can be formed and thus more light emitting devices can be provided. This contributes to achieving a brighter surface-area light source device.

By forming a side surface of the light guide plate through which light enters the light guide plate such that it has a staircase shape in which a middle portion projects more than the other portions, the side surface can be made thinner than and the same number of steps can be formed as in the case where the middle portion of the staircase shape does not project more than the other portions. This contributes to achieving a surface-area light source device having a narrower frame.

By disposing the light emitting devices on the steps formed in a side surface of the light guide plate, a larger number of light emitting devices can be provided. This contributes to achieving a brighter surface-area light source device.

By disposing the light emitting devices in a casing, the number of steps for disposing the light emitting devices can be larger by one than in the case where the light emitting devices are disposed on a side surface of the light guide plate. This contributes to achieving a still brighter surface-area light source device.

By disposing the light emitting devices such that light emitting devices disposed on a step are displaced, in a direction of a long side of a side surface through which light enters the light guide plate, with respect to light emitting devices disposed on an adjacent step, dark space generated between the light emitting devices disposed on a step can be eliminated by light from the light emitting devices disposed on an adjacent step. As a result, light uniformly enters the light guide plate through the side surface thereof, and this enables the light guide plate to uniformly output light from a top surface thereof.

The amount of light outputted from the surface-area light source device may be controlled by separately driving the light emitting devices disposed on different steps. Thus, the amount of light outputted from the surface-area light source device can be controlled by turning on/off a current to be fed to the light emitting devices disposed on different steps independently for each step. In this way, the amount of light outputted from the surface-area light source device can be controlled more easily than by controlling the amount of current fed to all the light emitting diodes.

By forming the light guide plate such that it is uniformly thick in a portion through which light exits the light guide plate, the portion not including a portion near a side surface through which light from the light emitting devices enters the light guide plate, it is possible to simplify the reflection and refraction of light inside the light guide plate. As a result, light is uniformly outputted from a light outputting surface of the light guide plate, and this facilitates decision on the shape and position of prisms or dots to be patterned on the light guide plate.

By forming the light guide plate such that it is thinner further away from a side surface thereof through which light from the light emitting devices enters the light guide plate, light is collected at a portion away from the side surface. This makes it possible to compensate for reduction of brightness in the portion away from the side surface through which light enters the light guide plate. As a result, unevenness in brightness of the surface-area light source device can be reduced.

By using light emitting diodes as the light emitting devices of the surface-area light source device, it is possible to make the light emitting devices brighter and more durable than in the case where cold-cathode tubes are used as the light emitting devices.

In the case where white light emitting diodes are used as the light emitting devices, since the light emitting diodes all emit light of the same color, there is no need to consider unevenness in color of light outputted from the light guide plate that occurs depending on how the light emitting diodes are arranged, and this facilitates the production of the surface-area light source device.

In the case where red, green, and blue light emitting diodes are used, in contrast to the case where cold-cathode tubes or white light emitting diodes are used, light outputted from the light guide plate contains no undesired wavelength, which is different from the wavelengths of the three primary colors. This enables the surface-area light source device to output light having higher purity, and thus makes it possible to widen the color reproduction range of a liquid crystal display device using this surface-area light source device.

By providing a light emitting device heat-dissipation unit, it is possible to reduce the temperature rise of the light emitting devices. As a result, a larger amount of current can be fed to the light emitting devices, and this contributes to increasing the brightness of the surface-area light source device.

According to various preferred embodiments of the present invention, a thinner and brighter liquid crystal display device can be achieved by using the surface-area light source device described above.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, descriptions will be given of various preferred embodiments of the present invention with reference to FIGS. 1 to 14.

First Preferred Embodiment

Figure 1:
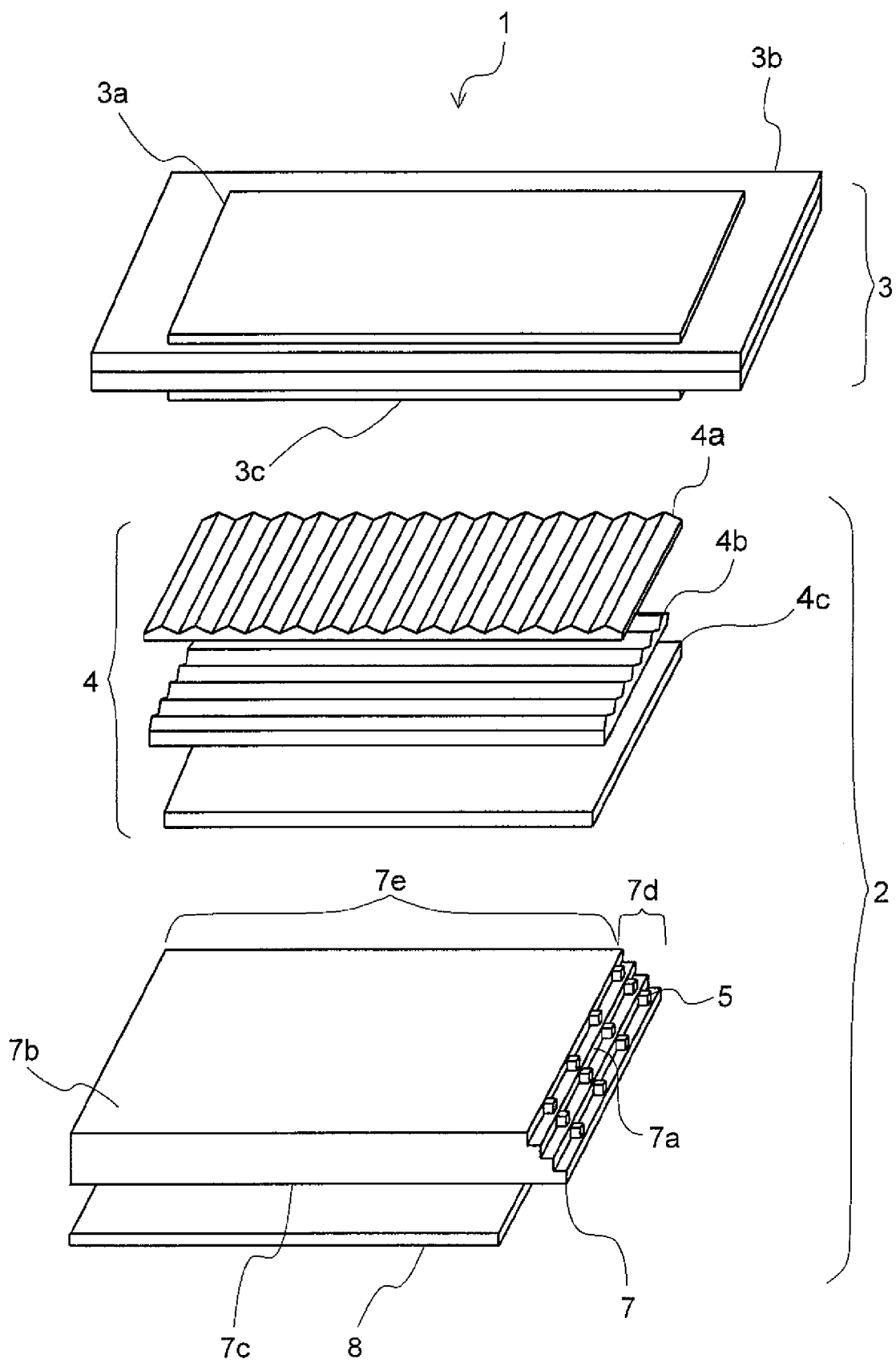
FIG. 1 is an exploded perspective view showing the structure of a liquid crystal display device and a surface-area light source device of a first preferred embodiment of the present invention.

First, with respect to a liquid crystal display device incorporating a surface-area light source device of a first preferred embodiment of the present invention, a brief description will be given of its operation, along with a brief description of its structure with reference to FIG. 1. FIG. 1 is an exploded perspective view showing the structure of the liquid crystal display device and the surface-area light source device.

As shown in FIG. 1, the liquid crystal display device 1 includes a liquid crystal display panel 3 and the surface-area light source device 2 that is placed on the rear surface side of the liquid crystal display panel 3.

The liquid crystal display panel 3 includes a liquid crystal panel 3b having a sandwiched liquid crystal layer (not shown) and polarization plates 3a and 3c that are placed on the top surface side and the bottom surface side of the liquid crystal panel 3b, respectively. The surface-area light source device 2 includes a transparent plate-shaped light guide plate 7, an optical control member 4 that is disposed on and in contact with a top surface 7b of the light guide plate 7, a reflection sheet 8 that is disposed on and in contact with a bottom surface 7c of the light guide plate 7, and a side-view type light emitting diode 5 that is a chip-type light emitting device disposed on a light entrance side surface 7a through which light enters the light guide plate 7.

The light guide plate 7 is formed of two portions: a light entrance portion 7d that is a portion near the light entrance side surface 7a; and a light exit portion 7e that is a portion that does not include the light entrance portion 7d and through which light exits the light guide plate 7. The light exit portion 7e surfaces the optical control member 4. On at least one of the top surface 7b and the bottom surface 7c of the light exit portion 7e, prisms or dots are patterned so as to achieve uniform output of light.

The optical control member 4 is formed of, for example, a diffusion sheet, a prism sheet, and a polarized light selective reflection sheet. The optical control member 4 is provided for the purpose of giving orientation to light that exits the light guide plate, and is typically formed of a combination of several sheets. FIG. 1 shows a case, as an example, where the optical control member 4 is formed of a diffusion sheet 4c, and prism sheets 4a and 4b that are formed such that peaks of prisms of the prism sheet 4a extend in a direction perpendicular or substantially perpendicular to a direction in which peaks of prisms of the prism sheet 4b extend. However, this is not meant to limit the combination of sheets used in the optical control member 4, and various combinations are possible depending on intended purposes; for example, the optical control member 4 may be formed of only one of these sheets, or it may be formed of all of these sheets combined as one.

The light emitting diode 5 emits light by being energized, and light emitted from the light emitting diode 5 enters the light guide plate 7 through the light entrance-side surface 7a. The light that has entered the light guide plate 7 is reflected and refracted inside the light guide plate 7 and diffuse-reflected by the prisms or the dots; thereby the light is smoothed in the shape of a plane, and exits the light guide plate through the top surface 7b thereof. Part of the light exits the light guide plate through the bottom surface 7c of the light guide plate 7, but reenters the light guide plate 7 by being reflected by the reflection sheet 8, and is diffuse-reflected.

The light that has exited the light guide plate 7 through the top surface 7b thereof enters the optical control member 4 to be oriented in a target direction and diffused according to the optical specification of the optical control member 4, and exits the optical control member 4.

The light that has exited the optical control member 4 enters the liquid crystal display panel 3. The liquid crystal display panel 3 controls the alignment of the liquid crystal so as to transmit or block the light that has exited the optical control member 4. Thereby, an image is displayed.

Figure 2:
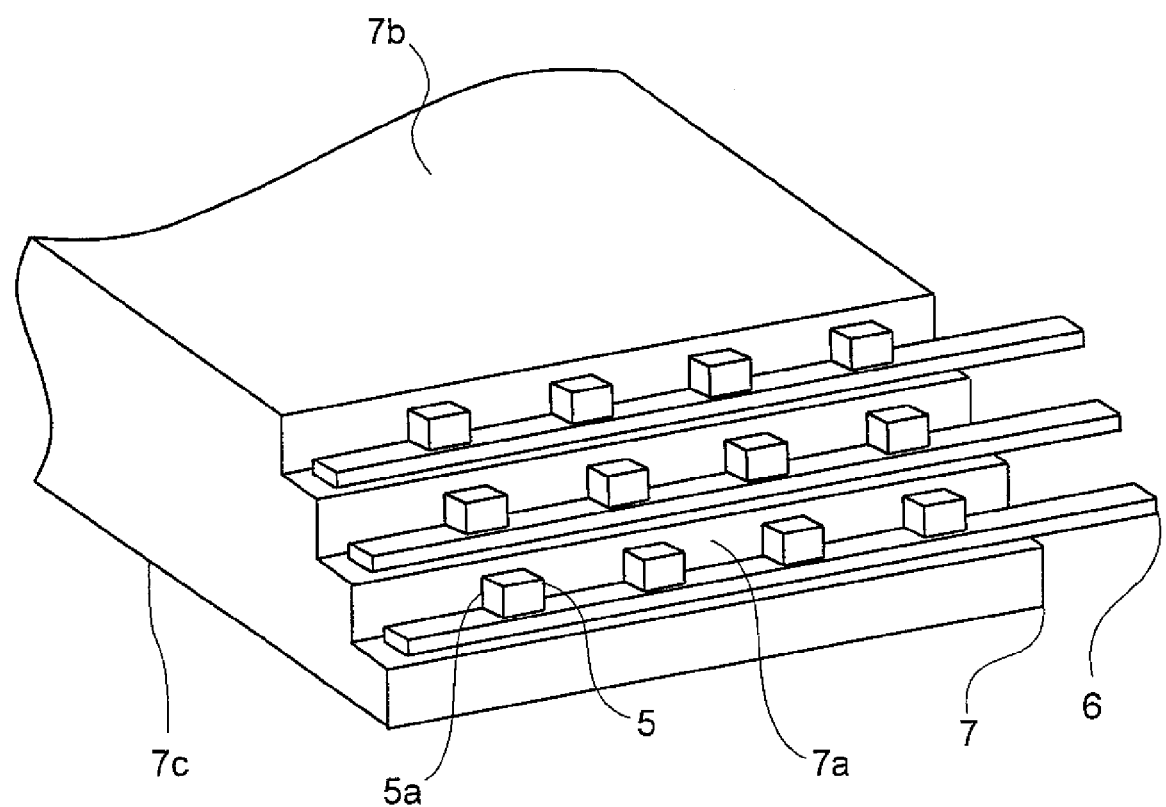
FIG. 2 is a perspective view showing a light entrance portion of a light guide plate of the surface-area light source device of the first preferred embodiment of the present invention.

Next, a detailed description will be given of the structure of the surface-area light source device of this preferred embodiment with reference to FIG. 2. FIG. 2 is a perspective view showing a light entrance portion of a light guide plate.

As shown in FIG. 2, the surface-area light source device 2 of this preferred embodiment includes the light guide plate 7, a flexible substrate 6, and the light emitting diode 5 provided on the substrate 6.

The light entrance side surface 7a of the light guide plate 7 has a staircase shape having a plurality of steps in a direction perpendicular or substantially perpendicular to a long side of the light entrance side surface 7a, and the flexible substrate 6 is provided on each of the steps. The light emitting diode 5 is disposed on the flexible substrate 6, and emits light when the flexible substrate 6 is energized. On each one of the steps, a light emitting surface 5a of the light emitting diode 5 surfaces the light entrance side surface 7a.

With the surface-area light source device 2 having the above described structure, it is possible to arrange light emitting diodes 5 on steps in a staircase pattern, and thus the distance between light emitting diodes 5 disposed on a step and light emitting diodes 5 arranged on an adjacent step can be maintained large even if the light guide plate is made thinner and the distance between the light emitting diodes 5 in the direction of the thickness of the light guide plate 7 is reduced. This helps reduce the giving and receiving of heat generated by the light emitting diodes 5, and thus the temperature rise of the light emitting diodes 5 can be reduced. As a result, the light guide plate 7 can be made thinner without reducing the brightness of light that exits it, and this contributes to reducing the thickness of the surface-area light source device 2.

It is preferable that the light emitting diodes 5 be disposed on every step formed in the light entrance portion 7d. Thus, a large number of light emitting diodes 5 can be provided, and this contributes to increasing the brightness of the surface-area light source device 2.

Use of the surface-area light source device 2 of this preferred embodiment makes it possible to reduce the thickness of and increase the brightness of the liquid crystal display device 1.

In this preferred embodiment, since flexible substrate 6, disposed one on each of the steps, are independent of one another, it is possible to provide a switching element on each of the flexible substrates 6 so as to control the operation of the light emitting diodes 5 independently for each one of the steps. This makes it possible to control the amount of light of the surface-area light source device 2 by turning on/off a current fed to each of the flexible substrates 6 independently for each one of the steps, and this is easier than controlling the amount of light of the surface-area light source device 2 by controlling the amount of current fed to all of the light emitting diodes 5. The light emitting diodes 5 may be provided directly on the steps of the light entrance portion 7d without using the flexible substrates 6.

The number of light entrance side surfaces of the light guide plate 7 is not limited to "one", and light may enter the light guide plate 7 through a plurality of side surfaces of the light guide plate 7. In this case, it is preferable that at least one of these side surfaces have a staircase shape.

The case shown in FIGS. 1 and 2 is not meant to limit the surface-area light source device 2 of this preferred embodiment, and more or fewer steps may be formed and more or fewer light emitting diodes 5 may be disposed in the light entrance portion 7d.

Second Preferred Embodiment

Figure 3:
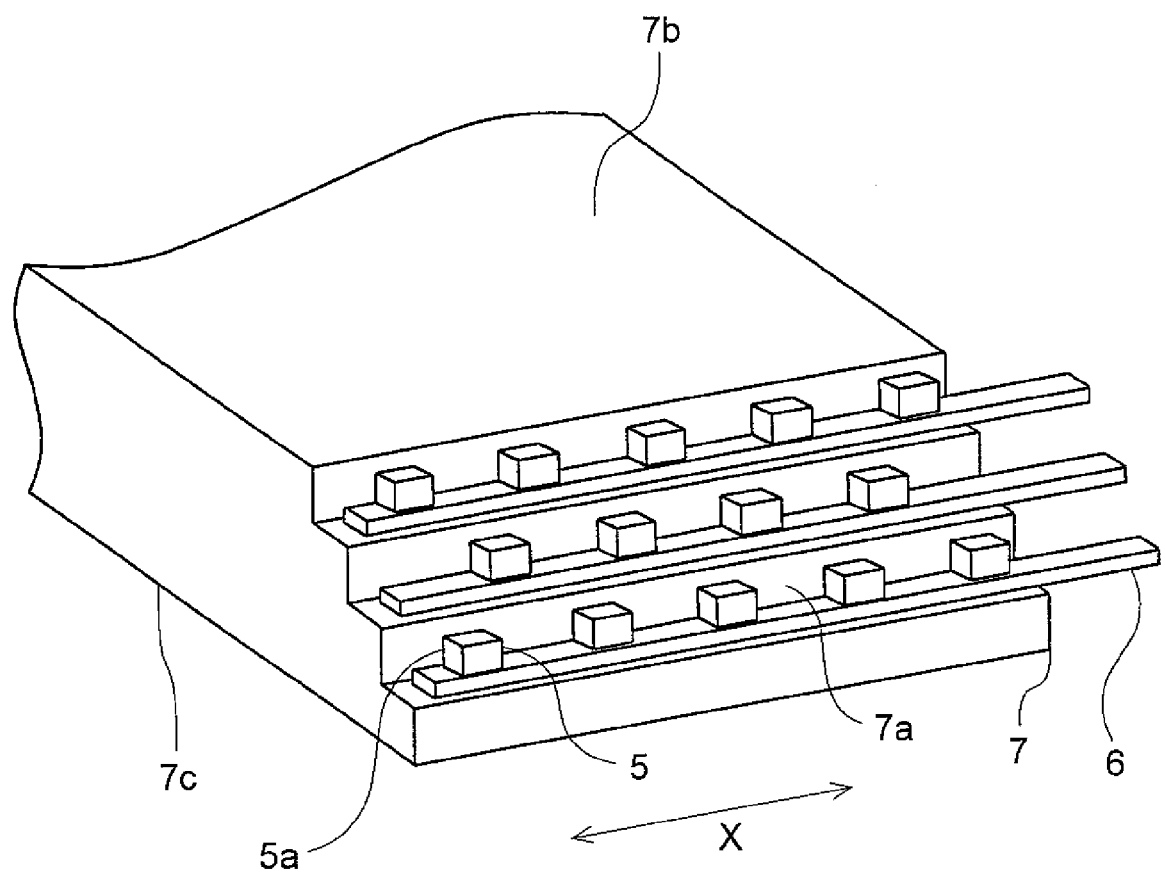
FIG. 3 is a perspective view showing a light entrance portion of a light guide plate of a surface-area light source device of a second preferred embodiment of the present invention.
Figure 4:
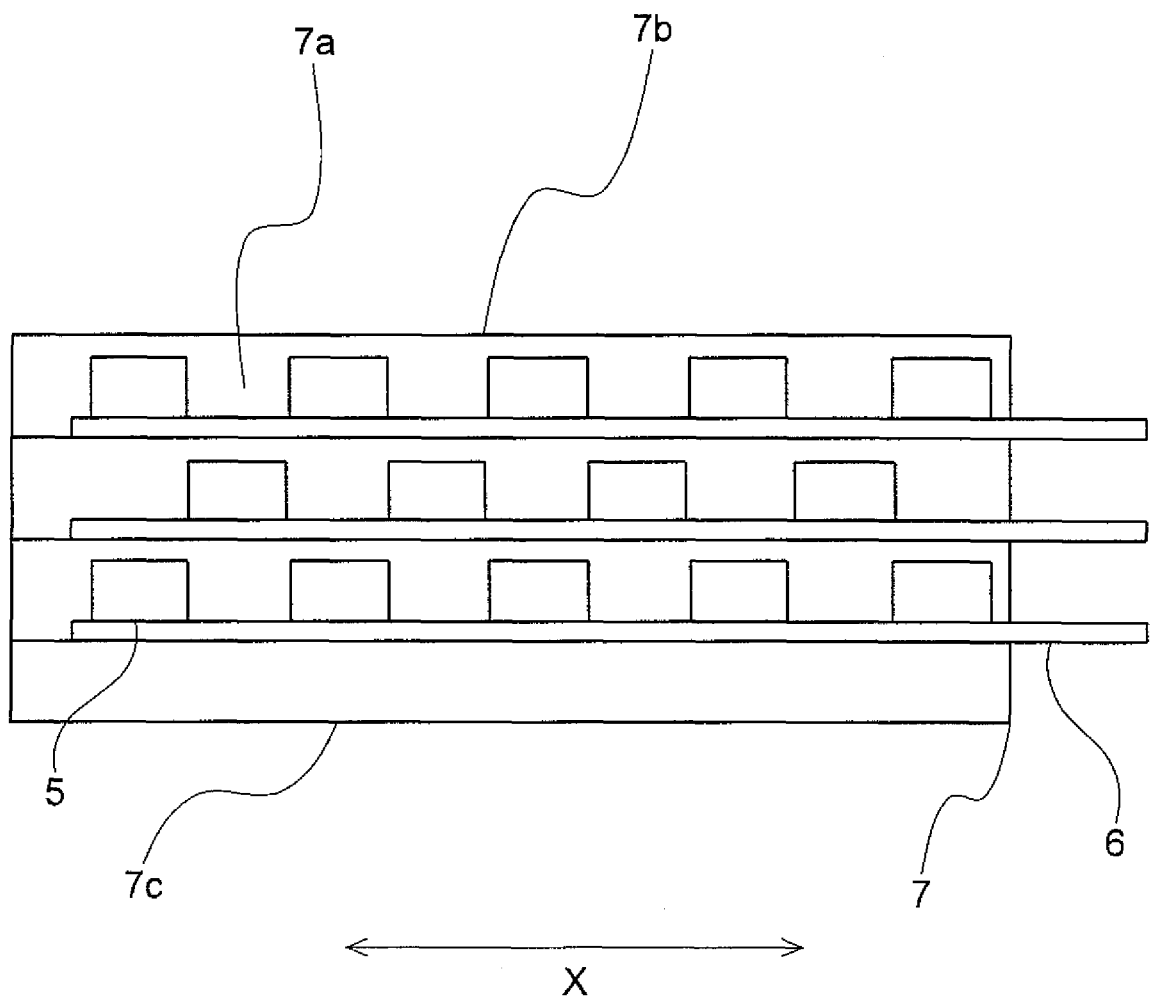
FIG. 4 is a front view showing the light entrance portion of the light guide plate of the surface-area light source device of the second preferred embodiment of the present invention.

Next, a description will be given of the structure of a surface-area light source device of a second preferred embodiment of the present invention with reference to FIGS. 3 and 4. FIG. 3 is a perspective view showing a light entrance portion of a light guide plate, and FIG. 4 is a front view showing the light entrance portion of the light guide plate. The liquid crystal display device and the surface-area light source device of this preferred embodiment are structured in the same manner as in the first preferred embodiment, and thus descriptions of them will be omitted.

As shown in FIGS. 3 and 4, light emitting diodes 5 disposed on a step are disposed such that they are displaced in the direction of a long side of the light entrance side surface 7a (i.e., the direction X in the figures) with respect to light emitting diodes 5 disposed on an adjacent step.

With the surface-area light source device 2 structured as described above, a dark space between the light emitting diodes 5 disposed on a step can be eliminated by light emitted from the light emitting diodes 5 disposed on an adjacent step. This allows light to uniformly enter the light guide plate 7 through the light entrance side surface 7a to uniformly exit the light guide plate 7 through the top surface 7b.

The light emitting diodes 5 disposed on a step are disposed farther from the light emitting diodes 5 disposed on an adjacent step than in the case where the light emitting diodes 5 are not displaced in position. This helps reduce the giving and receiving of heat generated by the light emitting diodes 5, and thereby the temperature rise of the light emitting diodes 5 can be reduced. As a result, a larger amount of current can be fed to the light emitting diodes 5, and this contributes to increasing the brightness of the surface-area light source device 2.

The case shown in FIGS. 3 and 4 is not meant to limit the surface-area light source device 2 of this preferred embodiment, and more or fewer steps may be formed and more or fewer light emitting diodes 5 may be disposed in the light entrance portion 7d.

Third Preferred Embodiment

Figure 5:
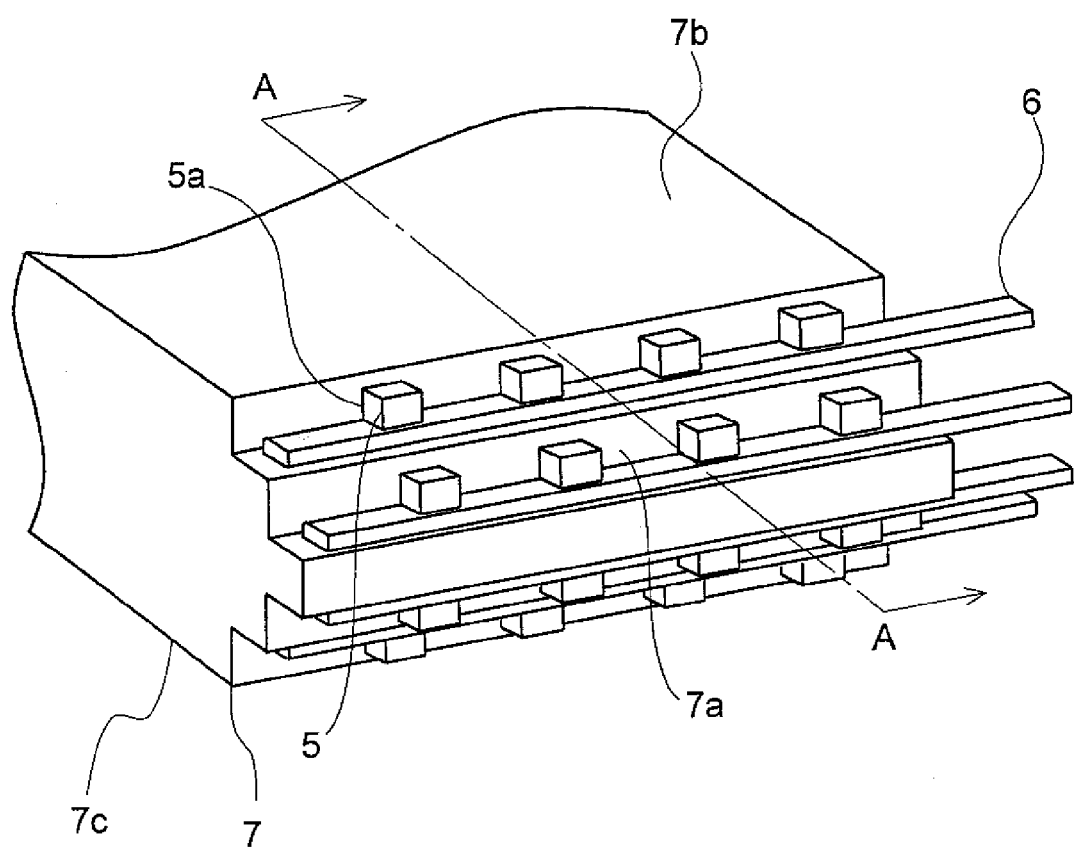
FIG. 5 is a perspective view showing a light entrance portion of a light guide plate of a surface-area light source device of a third preferred embodiment of the present invention.
Figure 6:
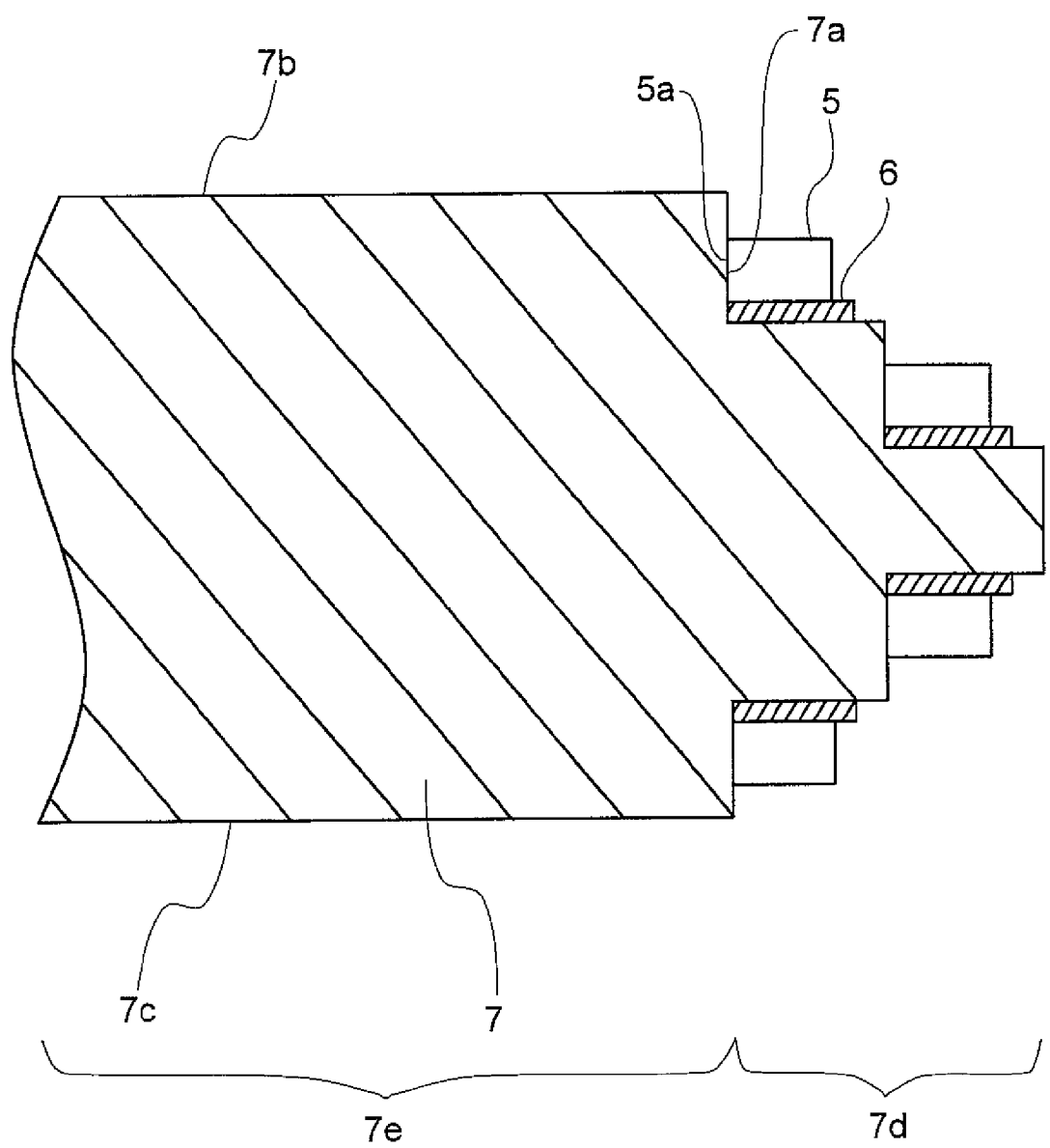
FIG. 6 is a sectional view showing the light entrance portion of the light guide plate of the surface-area light source device of the third preferred embodiment of the present invention.

Next, a description will be given of the structure of the surface-area light source device of a third preferred embodiment of the present invention with reference to FIGS. 5 and 6. FIG. 5 is a perspective view showing a light entrance portion of a light guide plate, and FIG. 6 is a sectional view taken along line A-A in FIG. 5 showing the light entrance portion of the light guide plate. The liquid crystal display device and the surface-area light source device of this preferred embodiment are structured in the same manner as in the first preferred embodiment, and thus descriptions of them will be omitted.

As shown in FIGS. 5 and 6, in the surface-area light source device 2 of this preferred embodiment, the light entrance side surface 7a of the light guide plate 7 has a staircase shape in which the middle portion projects more than the other portions. It is preferable that the upper and lower halves of the light guide plate 7 with respect to a plane located in the middle in the direction of the thickness of the light guide plate 7 be plane symmetric with respect to the plane, which serves as the symmetry plane.

In the light entrance side surface 7a of the light guide plate 7 of the above-structured surface-area light source device 2, which has the staircase shape in which the middle portion projects more than the other portions, the width can be reduced without reducing the number of steps in comparison with the case where the middle portion does not project more than the other portions. This contributes to achieving the surface-area light source device 2 having a narrower frame.

As in the second preferred embodiment, the light emitting diodes 5 disposed on a step may be displaced in a direction along a long side of the light entrance side surface 7a with respect to the light emitting diodes 5 disposed on an adjacent step.

The case shown in FIGS. 5 and 6 is not meant to limit the surface-area light source device 2 of this preferred embodiment, and more or fewer steps may be formed and more or fewer light emitting diodes 5 may be provided in the light entrance portion 7d.

In the first to third preferred embodiments, the light emitting diodes 5 may be white light emitting diodes, or they may be red, green, and blue light emitting diodes.

In the case where white light emitting diodes are used, since the light emitting diodes all emit light of the same color, there is no need of considering unevenness in color occurring, depending on how the light emitting diodes are disposed, in light that exits the light guide plate 7, and this facilitates the production of the surface-area light source device 2.

In the case where red, green, and blue light emitting diodes are used, in contrast to the case where cold-cathode tubes or white light emitting diodes are used, light that exits the light guide plate 7 contains no undesired wavelength, which is different from the wavelengths of the three primary colors. As a result, light that exits the surface-area light source device 2 has higher purity, and thus it is possible to widen the color reproduction range of the liquid crystal display device 1 incorporating this surface-area light source device 2.

Figure 7:
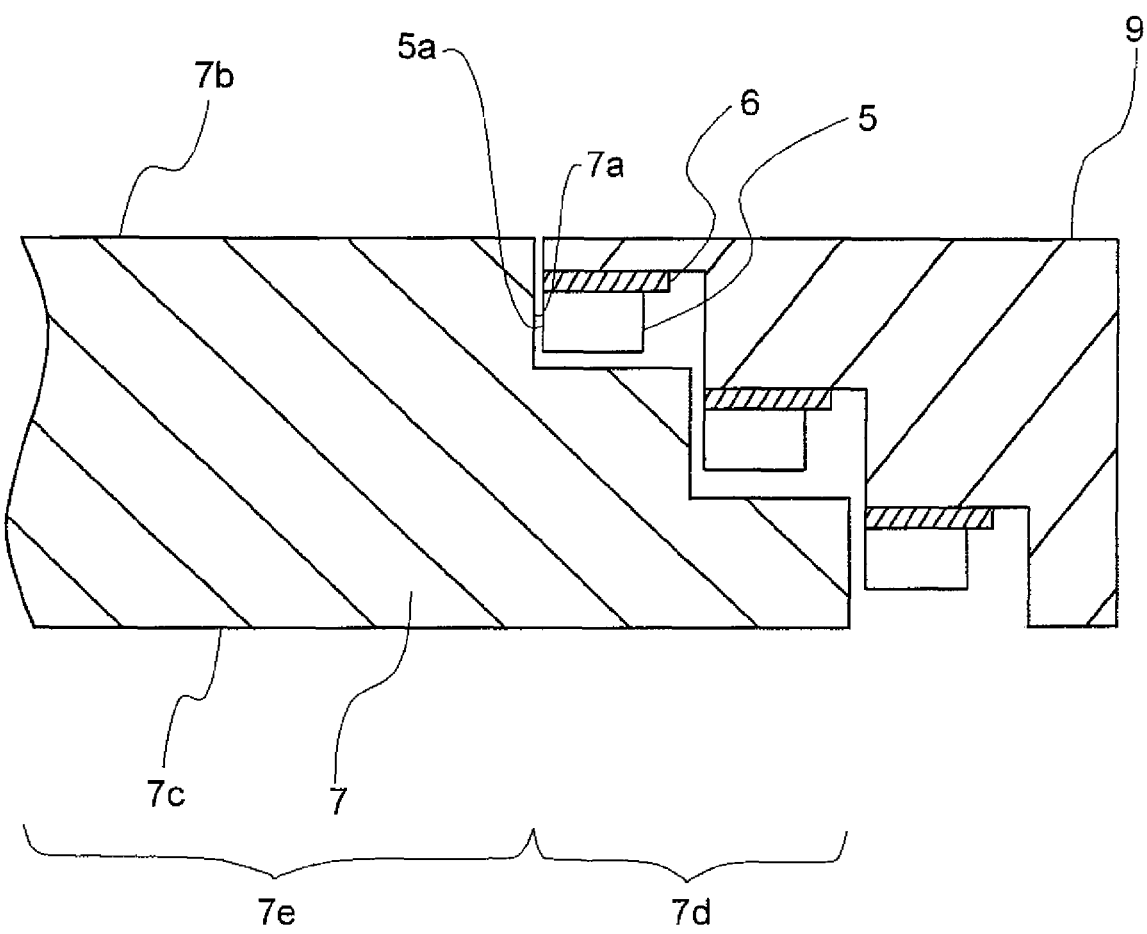
FIG. 7 is a sectional view showing the light entrance portion of the light guide plate of the surface-area light source device of the first and second preferred embodiments of the present invention.
Figure 8:
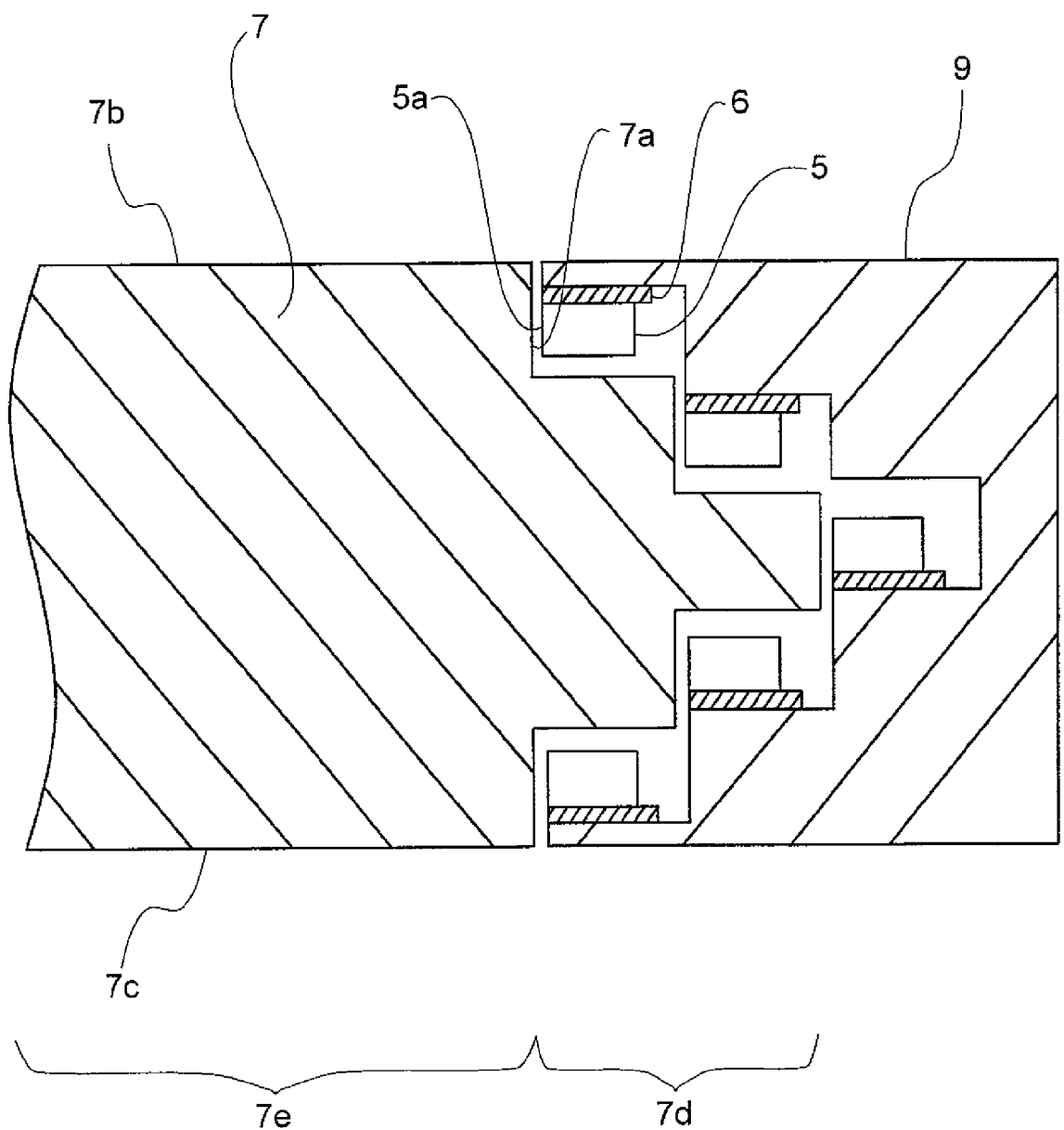
FIG. 8 is a sectional view showing the light entrance portion of the light guide plate of the surface-area light source device of the third preferred embodiment of the present invention.

A casing such as a frame may be formed around the light guide plate 7. FIGS. 7 and 8 are each a sectional view showing a portion around a light entrance portion of a light guide plate that corresponds to the portion shown in FIG. 6. FIGS. 7 and 8 show the cases where the casing is adopted in the second and third embodiments, respectively. As shown in these figures, a casing 9 such as a frame is formed to be engaged with the light entrance side surface 7a. In the casing 9, steps are formed corresponding to the shape of the light entrance side surface 7a, and light emitting diodes 5 and the flexible substrates 6 are disposed on the steps. By disposing the light emitting diodes 5 and the flexible substrates 6 on the steps formed in the casing 9, the number of steps on which the light emitting diodes 5 and the flexible substrates 6 are disposed can be increased by one in comparison with the case where the light emitting diodes 5 and the flexible substrates 6 are disposed on the steps formed in the light entrance portion 7d, and as a result, the brightness of the surface-area light source device 2 can be increased. In the case shown in FIG. 7, the casing 9 can be directly brought into engagement with the light guide plate 7 from the top surface 7b side. On the other hand, in the case shown in FIG. 8, since the middle portion of the light entrance side surface 7a of the light guide plate 7 projects, the casing 9 cannot be directly brought into engagement with the light guide plate 7. In this case, it is preferable that the casing 9 be separated at the center thereof in its thickness direction and that the separated halves sandwich the light guide plate 7 from the top surface 7b side and the bottom surface 7c side.

Figure 9:
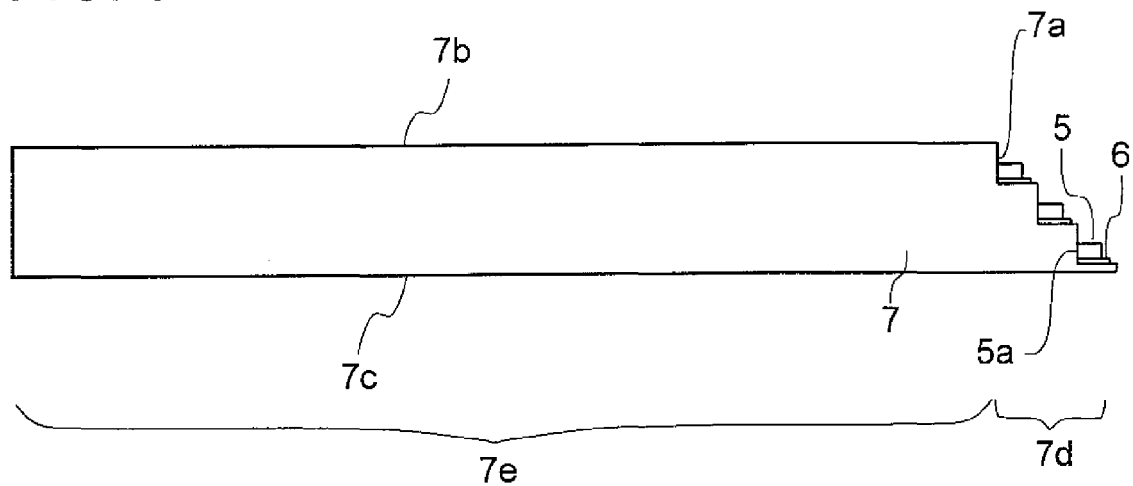
FIG. 9 is a side view showing the light guide plate of the surface-area light source device of the first and second preferred embodiments of the present invention.
Figure 10:
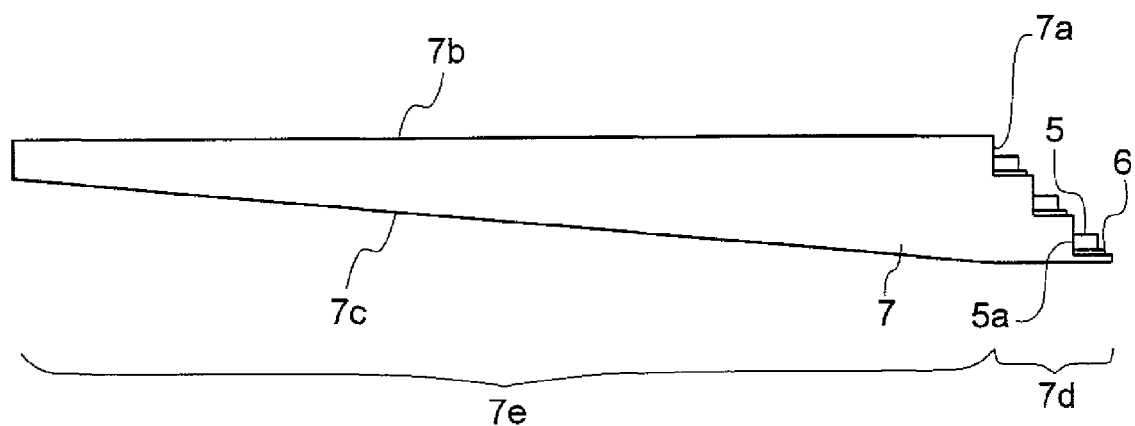
FIG. 10 is a side view showing the light guide plate of the surface-area light source device of the first and second preferred embodiments of the present invention.
Figure 11:
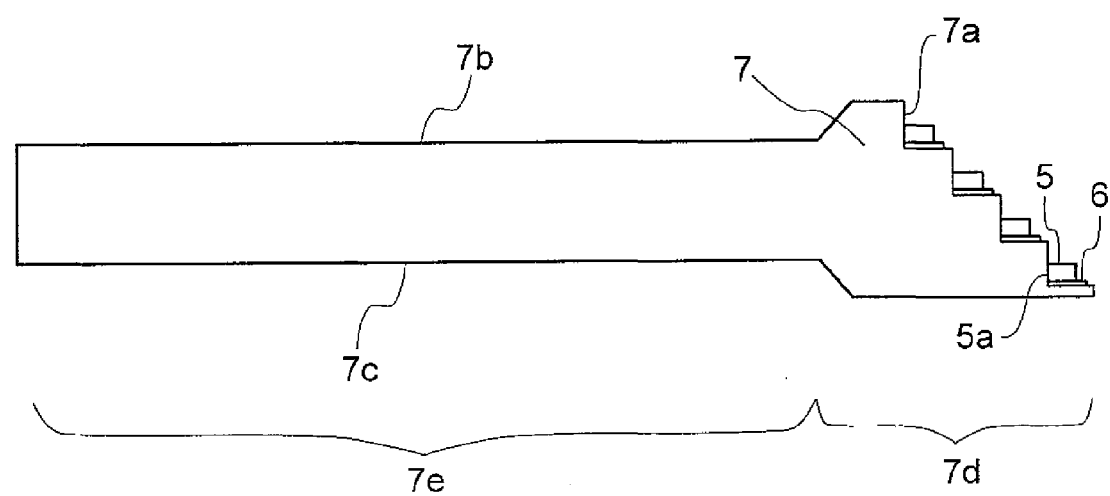
FIG. 11 is a side view showing the light guide plate of the surface-area light source device of the first and second preferred embodiments of the present invention.

The light guide plate may also have the shapes shown in FIGS. 9 to 11, which are side views. FIGS. 9 to 11 show examples applied to the first and second preferred embodiments.

FIG. 9 shows the light guide plate 7 in which the thickness of the light exit portion 7e excluding the light entrance portion 7d is uniform. The uniform thickness simplifies the reflection and refraction of light inside this light guide plate 7. This makes it easy to determine the shapes and the positions of the prisms or the dots to be patterned in the light exit portion 7e.

FIG. 10 shows the light guide plate 7 that is thinner further away from the light entrance portion 7d. In this light guide plate 7, light is collected at a position away from the light entrance portion 7d, and this compensates for the reduction of brightness occurring away from the light entrance portion 7d. In this way, use of this light guide plate 7 helps reduce the unevenness in brightness of the surface-area light source device 2 in the right/left direction in the figure.

As shown in FIG. 11, the light entrance portion 7d may be made thicker than the light exit portion 7e. In this way, more steps can be formed, and thus a greater number of light emitting diodes 5 can be provided without increasing the thickness of the light exit portion 7e. Thus, use of this light guide plate 7 contributes to increasing the brightness of the surface-area light source device 2.

Figure 12:
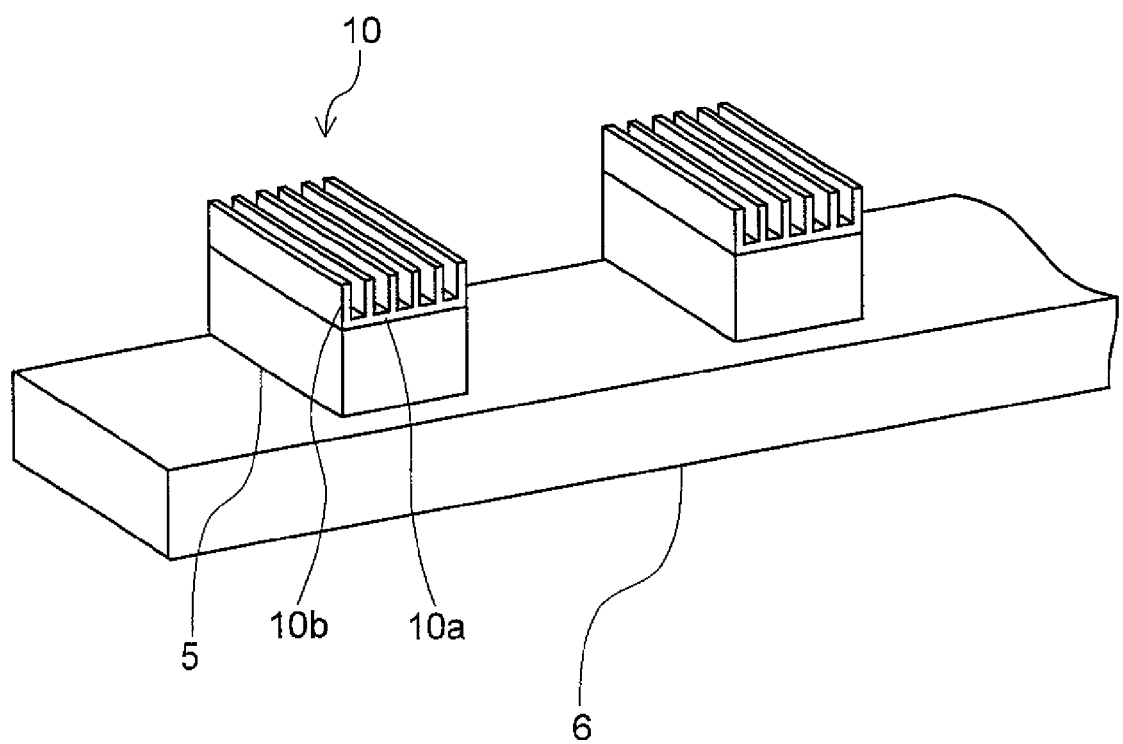
FIG. 12 is an expanded perspective view showing an area around light emitting diodes arranged on a flexible substrate of the surface-area light source device of the first to third preferred embodiments of the present invention.

As shown in FIG. 12, which is an expanded perspective view showing an area around light emitting diodes disposed on a flexible substrate, there may be provided a light emitting diode heat-dissipation unit.

As shown in FIG. 12, as the heat dissipation unit, a heat sink 10 is provided on top of each of the light emitting diodes 5. The heat sink 10 is formed of a material having a high thermal conductivity such as metal, composed of a plate-shaped base 10a and a plurality of fins 10b stood at predetermined intervals on the base 10a, and absorbs heat generated by each of the light emitting diodes 5 to dissipate the heat to the ambient air. This helps achieve efficient dissipation of heat generated by the light emitting diodes 5, and thus the temperature rise of the light emitting diodes 5 can be reduced. As a result, a greater amount of current can be fed to the light emitting diodes 5, and this contributes to increasing the brightness of the surface-area light source device 2. The heat sink 10 may be provided at a side of each of the light emitting diodes 5.

Figure 13:
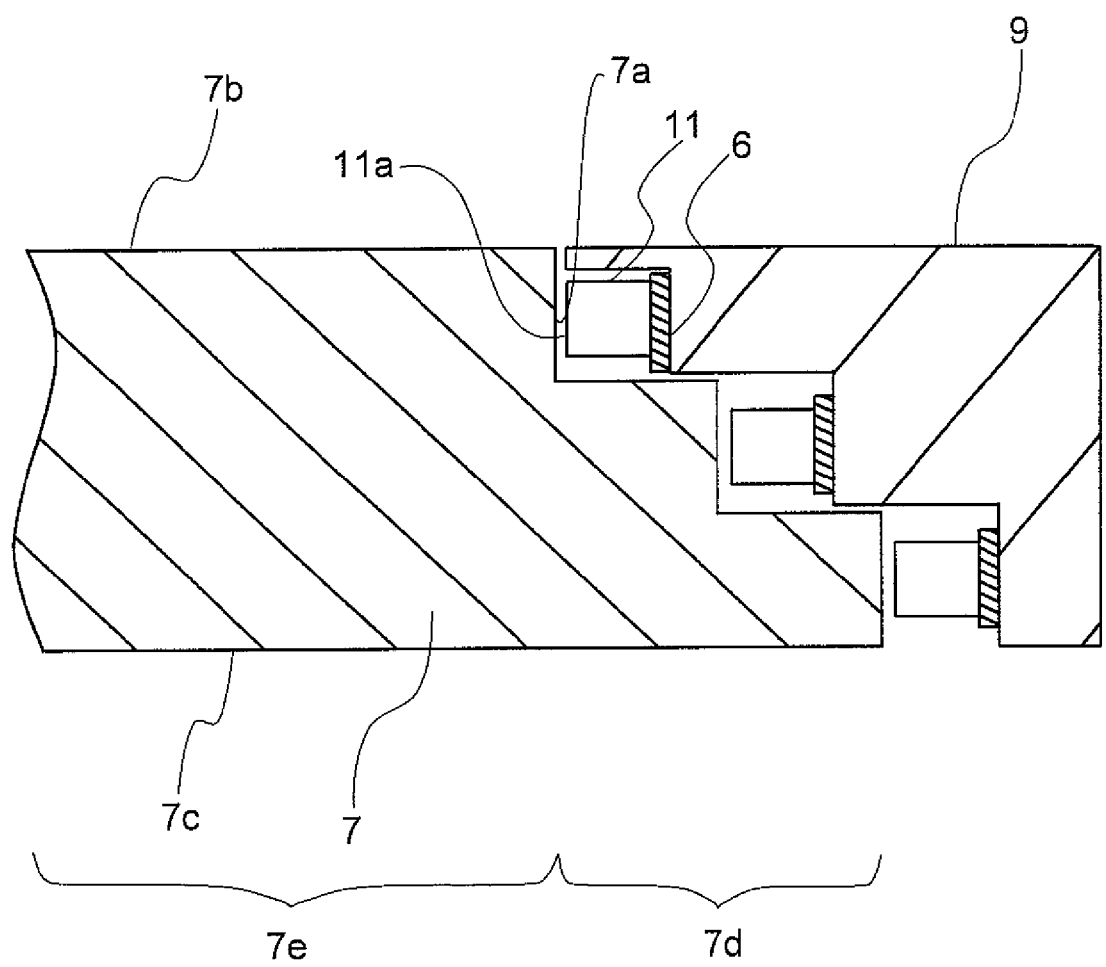
FIG. 13 is a sectional view showing an area around the light entrance portion of the light guide plate of the surface-area light source device of the first and second preferred embodiments of the present invention.
Figure 14:
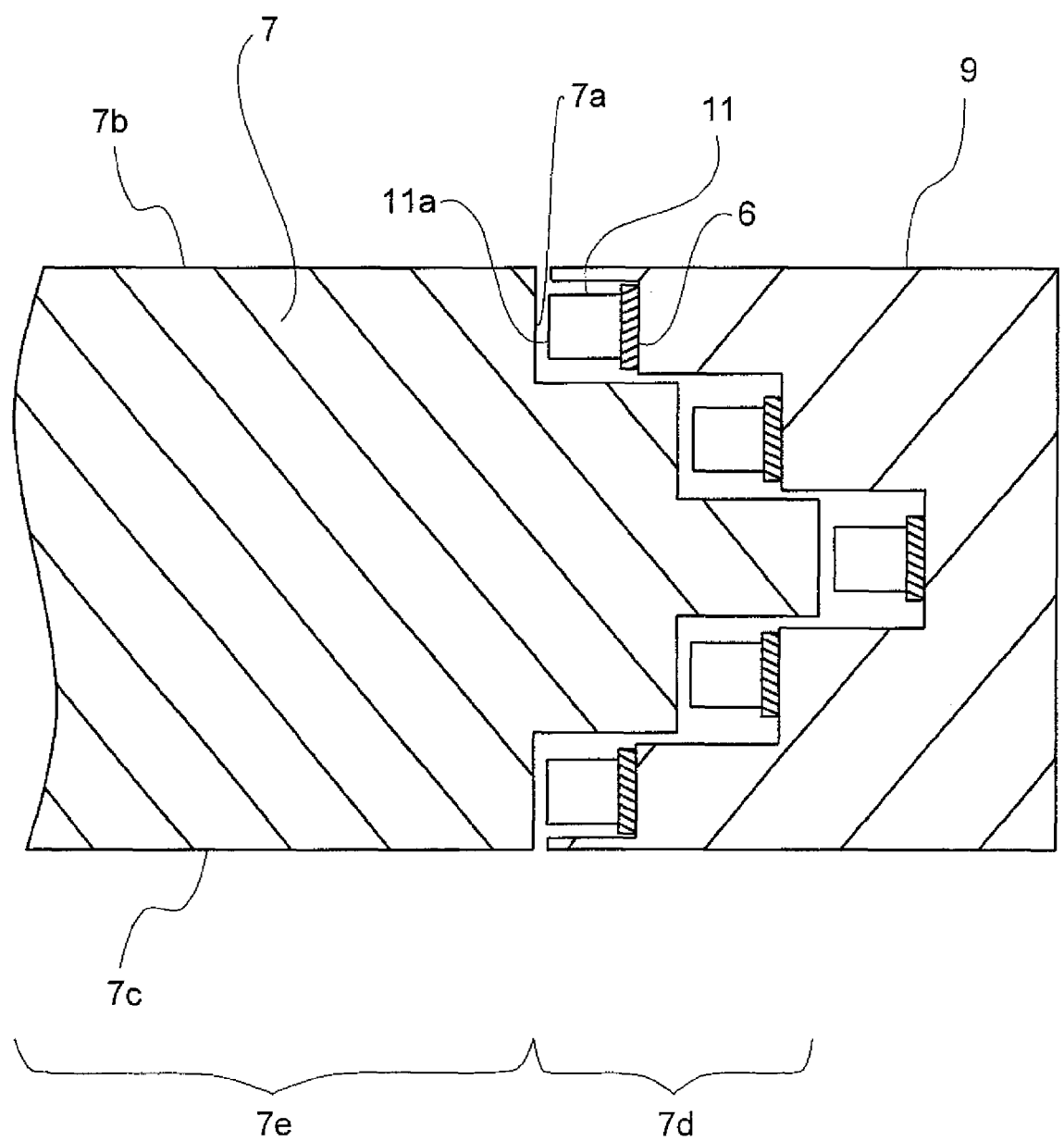
FIG. 14 is a sectional view showing an area around the light entrance portion of the light guide plate of the surface-area light source device of the third preferred embodiment of the present invention.

The light emitting diodes 5 may be of side-view type as shown in FIGS. 1 to 12 that emits light in the direction parallel to the flexible substrates 6, or instead, they may be of top-view type such as a light emitting diode 11 as shown in FIGS. 13 and 14 that emits light in the direction perpendicular or substantially perpendicular to the flexible substrates 6. FIGS. 13 and 14 are each a sectional view showing a portion around a light entrance portion of a light guide plate that corresponds to the portion shown in FIG. 6. In the case where the top-view type light emitting diodes 11 are used, it is preferable that the flexible substrates 6 and the light emitting diodes 11 be disposed in the casing 9 such that each of the light emitting surfaces 11a of the light emitting diodes 11 surfaces the light entrance side surface 7a of the light guide plate 7.

Descriptions have been hitherto given of the first to third preferred embodiments of the present invention, but they are not meant to limit the scope of the present invention in any manner, and various modifications can be made in practicing the present invention within its spirit.

The present invention can be generally used in surface-area light source devices incorporated in liquid crystal display devices.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A surface-area light source device, comprising:
    a light guide plate arranged to receive light through a side surface thereof and to output the light from a top surface thereof; and
    a plurality of light emitting devices arranged to emit light that enters the light guide plate through a side surface of the light guide plate; wherein
    at least one side surfaces of the light guide plate through which light from the light emitting devices enters the light guide plate has a staircase shape, including steps in a direction that is substantially perpendicular to a long side of a side surface of the light guide plate; and
    the light emitting devices are fixed to a corresponding surface of the steps.

2. The surface-area light source device of claim 1, wherein the light guide plate is thicker near a side surface of the light guide plate through which light from the light emitting devices enters the light guide plate than in a portion through which light exits the light guide plate.

3. The surface-area light source device of claim 1, wherein a side surface of the light guide plate through which light from the light emitting devices enters the light guide plate has a staircase shape, a middle portion of the side surface projecting more than other portions.

4. The surface-area light source device of claim 1, wherein the light emitting devices disposed on one of the steps are displaced in a direction of a long side of a side surface on which light is incident with respect to the light emitting devices disposed on an adjacent one of the steps.

5. The surface-area light source device of claim 1, wherein the light emitting devices disposed on different ones of the steps are driven separately.

6. The surface-area light source device of claim 1, wherein the light guide plate is uniformly thick in a portion thereof through which light exits the light guide plate, the portion not including a portion near a side surface through which light from the light emitting devices enters the light guide plate.

7. The surface-area light source device of claim 1, wherein the light guide plate is thinner at a location further away from a side surface through which light from the light emitting devices enters the light guide plate.

8. The surface-area light source device of claim 1, wherein the light emitting devices are white light emitting diodes.

9. The surface-area light source device of claim 1, wherein the light emitting devices are red, green, and blue light emitting diodes.

10. The surface-area light source device of claim 1, wherein the light emitting devices are side-view light emitting diodes.

11. The surface-area light source device of claim 1, wherein the light emitting devices are top-view light emitting diodes.

12. The surface-area light source device of claim 1, further comprising a light emitting device heat-dissipation unit for the light emitting devices.

13. A liquid crystal display device, comprising:

the surface-area light source device of claim 1.

14. The surface-area light source device of claim 1, further comprising:

a substrate to which two or more of the light emitting devices are fixed; wherein the light emitting devices are fixed to the steps by directly fixing the substrate to one of the steps of the staircase-shaped side surface of the light guide plate.

15. The surface-area light source device of claim 1, wherein the light emitting devices are fixed to the steps such that light emitting surfaces of the of the light emitting devices oppose surfaces of the light guide plate that define the steps and are substantially perpendicular to the top surface of the light guide plate.

* * * * *